US008338494B2

(12) United States Patent
Nachtkamp et al.

(10) Patent No.: US 8,338,494 B2
(45) Date of Patent: Dec. 25, 2012

(54) NANOPARTICLES FROM SLIGHTLY OXIDISED CELLULOSE

(75) Inventors: Klaus Nachtkamp, Walsrode (DE); Christa Krüger, Schneverdingen (DE); Jürgen Engelhardt, Bad Fallingbostel (DE); Volker Kriegisch, Walsrode (DE); Steffen Fischer, Freital (DE); Manfred Pinnow, Teltow (DE); Kay Hettrich, Schwielowsee/Caputh (DE)

(73) Assignee: Dow Global Technologies LLC, Midland, MI (US)

( * ) Notice: Subject to any disclaimer, the term of this patent is extended or adjusted under 35 U.S.C. 154(b) by 218 days.

(21) Appl. No.: 12/672,799

(22) PCT Filed: Aug. 8, 2008

(86) PCT No.: PCT/EP2008/006548
§ 371 (c)(1),
(2), (4) Date: Feb. 9, 2010

(87) PCT Pub. No.: WO2009/021688
PCT Pub. Date: Feb. 19, 2009

(65) Prior Publication Data
US 2011/0198533 A1 Aug. 18, 2011

(30) Foreign Application Priority Data
Aug. 10, 2007 (EP) .................................. 07015803

(51) Int. Cl.
*B01F 3/12* (2006.01)
*C08B 1/00* (2006.01)

(52) U.S. Cl. ...................... 516/77; 252/182.12; 428/402; 977/773; 977/786; 977/840

(58) Field of Classification Search .................... 516/77; 252/182.12; 428/402; 977/773, 786, 840
See application file for complete search history.

(56) References Cited

U.S. PATENT DOCUMENTS

| 4,483,743 A | 11/1984 | Turbak et al. |
| 5,780,618 A | 7/1998 | Banker et al. |
| 7,357,339 B2 | 4/2008 | Kondo et al. |
| 2005/0239744 A1 | 10/2005 | Ioelovich et al. |

FOREIGN PATENT DOCUMENTS

| CN | 1470552 | | 1/2004 |
| CN | 1749278 | * | 3/2006 |
| WO | 2006034837 A2 | | 4/2006 |

OTHER PUBLICATIONS

Bragd et al. ("TEMPO-mediated oxidation of polysaccharides: survey of methods and applications", Topics in Catalysis vol. 27, Feb. 2004, p. 49-66).*
Ioelovich et al.; "Microcystalline Cellulose: Nano-Structure Formation"; Cellulose Chemistry and Technology; 2006; pp. 313-317; vol. 40; Issue 5.
Klemm et al.; "Oxidation of Cellulose"; Comprehensive Cellulose Chemistry; 1998; pp. 304-309; vol. 2; Wiley-VCH Verlag GmbH & Co. KGaA; Weinheim.
Miriam De Souza Lima et al.; Rodlike Cellulose Microcrystals: Structure, Properties, and Applications; Macromolecular Rapid Communications; 2004; pp. 771-787; vol. 25; Wiley-VCH Verlag GmbH & Co. KGaA; Weinheim.
Montanari et al.; "Topochemistry of Carboxylated Cellulose Nanocrystals Resulting from TEMPO-Mediated Oxidation"; Macromolecules; 2005; pp. 1665-1671; vol. 38; American Chemical Society.
Ono et al.; New Aqueous Dispersion of Cellulose Sub-Micron Particles: Preparation and Properties of Transparent Cellulose HydroGel(TCG); Transactions of the Materials Research Society of Japan; 2001; pp. 569-572; vol. 26; Issue 2.
Saito et al.; "TEMPO-Mediated Oxidation of Native Cellulose: SEC-MALLS Analysis of Water-Soluble and -Insoluble Fractions in the Oxidized Products"; Cellulose; 2005; pp. 305-315; vol. 12; Sprunger.
Zhang et al.; Facile Synthesis of Spherical Cellulose Nanoparticles; Carbohydrate Polymers; 2007; pp. 607-611; vol. 69; Elsevier.

* cited by examiner

*Primary Examiner* — Ling Choi
*Assistant Examiner* — Chun-Cheng Wang

(57) ABSTRACT

The present invention provides novel nanoscale cellulose particles and also a process for their production. The cellulose-based particles obtained have volume-averaged particle sizes of less than 300 run. These nanoparticles are produced from slightly oxidized cellulose and by input of energy into a water-containing medium after or during dispersion.

9 Claims, 3 Drawing Sheets

Figure 1:
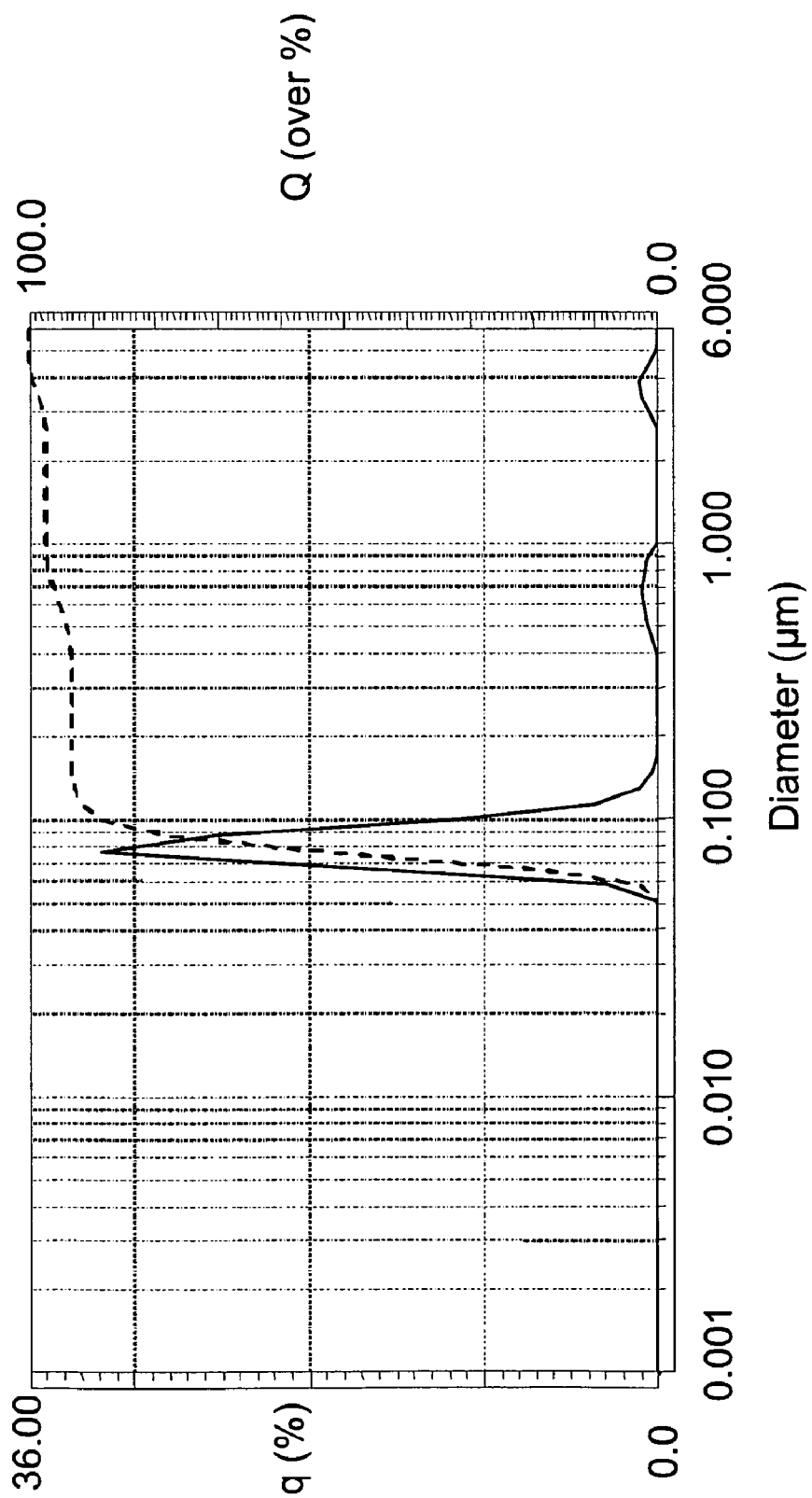

NANOPARTICLES FROM SLIGHTLY OXIDISED CELLULOSE

CROSS REFERENCE TO RELATED APPLICATIONS

This application is a 35 USC §371 national phase filing of PCT/EP08/06548 filed Aug. 8, 2008, which claims the benefit of European Application No. 07015803.5, filed Aug. 10, 2007.

The present invention relates to novel nanoscale cellulose particles and also to a process for their production and to the use.

Alongside information technology and biotechnology, nanotechnology is regarded as the major technological development of our times. In general, nanotechnology is concerned with the construction, properties and effect/activity of structures measuring several hundred nanometers (nm) or less. Applications are arising in almost all areas of everyday life, for example energy technology, environmental technology, information technology and the pharmaceutical and medical sector.

Cellulose is the most commonly occurring biopolymer on Earth and therefore the globally most significant renewal raw material. As the main constituent of the scaffolding substance in plants, a cellulose has outstanding molecular properties. Even in its natural state it contains ordered regions (crystallites) having the typical dimensions of nanoparticles (3-10 nm wide and up to 100 nm long). These regions, however, are connected to each other via non-crystalline macromolecules and also via secondary valency bonds (hydrogen bonds).

Various approaches have hitherto been pursued to produce cellulose-based nanoparticles which are very substantially free of superstructures. Their common idea is for individual particles of cellulose to be separated from one another and stabilized to arrive at primary particles which are not bonded together by hard irreversible agglomeration.

This typically involves mechanical and/or chemical operations (De Souza Lima, Borsali, Macromol. Rapid Commun. 25 (2004) 771, Ono, Shimaya, Hongo, Yamane, Transactions of the Materials Research Society of Japan 26 (2001) 569, Ioelovich, Leykin, Cellulose Chem. Technol. 40 (2006) 313, Zhang, Elder, Pu, Ragauskas, Carbohydr. Polym. 69 (2007) 607, US-A 2005 0239744, WO 2006/034837 A2, EP 1582551 A1, DE 3047351 C2).

CN 1470552 discloses the production of cellulose particles on the order of 50 to 200 nm in size wherein cellulose is initially dissolved in a suitable solvent and subsequently dispersed by intensive stirring into a sedimentation solution. Stabilizing the particles which form in the process requires the addition of external emulsifiers such as fatty acid salts or alkylbenzenesulphonates. This process provides only extremely dilute dispersions having a cellulose content of below 0.5% by weight.

CN 1749278 A proceeds from vegetable fibres which are subjected to alkaline digestion, oxidative bleaching and degradation with aqueous sodium hydroxide solution and chlorine gas and also subsequent intensive ultrasonic treatment to obtain a gel which contains spherical particles of cellulose 10-20 nm in size. This process is likely to result in appreciable degradation of polymer chains. No data is recorded in this reference of the extent of this chain degradation or the nature and extent of any oxidation of the cellulose determined after this process.

Oxidized cellulose having different degrees of oxidation is used by Montanari et al. (Macromolecules 38 (2005) 1665) for producing carboxylated cellulose microfibrils. The oxidation generally involves a reaction with sodium hypochlorite, sodium bromide and 2,2,6,6-tetramethyl-1-piperidinyloxy free radical (TEMPO) and takes place very substantially at the C6 position of the anhydroglucose unit (AGU). The oxidized celluloses are subjected to acid hydrolysis and subsequently dispersed mechanically. Stable suspensions are obtained at the end. TEM micrographs show that all the samples still show evidence of the fibrilar structure of cellulose, with fibril lengths being distinctly above 200 nm.

Further ways of providing oxidized celluloses include oxidation with periodate (oxidation predominantly in the 2,3-position of the AGU), with phosphoric acid and sodium nitrite (oxidation predominantly in the 6-position of the AGU) (Klemm, Philipp, T. Heinze, U. Heinze, Wagenknecht in "Comprehensive Cellulose Chemistry", Wiley-VCH Weinheim 1998, Vol. 2, pp. 304-309).

However, the results of these methods are unsatisfactory with regard to fineness and convenience. This is because many of the processes described in the literature lead to fibrillar particles which are nanoscale in cross section only and have fibre lengths of distinctly above 200 nm. Hitherto only one process is known for producing nanoparticulate cellulose under oxidative degrading conditions, namely that described in CN 1749278, and it involves appreciable cost and inconvenience and has high environmental impact. Furthermore, the addition of external stabilizers, which are not covalently bonded to the particles, is undesirable, since these stabilizers can be washed off or disrupt many applications, for example in the field of pharmaceutical formulations.

It is an object of the present invention to provide novel cellulose-based nanoparticles which are dispersible to primary particles and are obtainable by a technically comparatively straightforward process without the additional step of degradation of the cellulose by acid hydrolysis and do not necessarily require external emulsifiers for particle formation.

We have found that this object is achieved by shearing or ultrasonic dispersion of specific slightly oxidized cellulose.

The present invention accordingly provides particles of slightly oxidized cellulose having volume-average particle sizes (D50 value) of less than 300 nm, preferably less than 200 nm and more preferably less than 100 nm, measured by dynamic laser light scattering.

The present invention further provides a process for producing dispersions containing particles of slightly oxidized cellulose having volume-average particle sizes (D50 value) of less than 300 nm, preferably less than 200 nm and more preferably less than 100 nm, measured by dynamic laser light scattering, which process comprises
  a) slightly oxidized cellulose, preferably slightly oxidized non-nanoscale cellulose, being introduced into an aqueous, preferably not strongly acidic medium and
  b) being simultaneously or subsequently dispersed therein by input of energy.

In a preferred embodiment of the invention, the D90 value and more preferably also the D95 value of the amorphous cellulose particles is less than 300 nm, preferably less than 200 nm and more preferably less than 100 nm, the particles preferably being present agglomerate-free, i.e. dispersed to primary particles.

The slightly oxidized cellulose, preferably slightly oxidized non-nanoscale cellulose, suitable for step a) in the above process according to the present invention can be obtained from all commercial pulps, for example, chemical pulp, paper-grade pulp, microcrystalline cellulose or linters cellulose.

"Non-nanoscale cellulose" refers to cellulose having a volume-average particle size (D50 value) of at least 300 nm, preferably at least 200 nm and more preferably at least 100 nm, determined by dynamic laser light scattering.

"Slightly oxidized cellulose" refers to cellulose being minimally oxidized. The requisite minimal oxidation can be effected via processes known in the literature, for example by oxidation with periodate, phosphoric acid/sodium nitrite, or sodium hypochlorite under TEMPO catalysis, of which TEMPO-catalysed sodium hypochlorite oxidation is preferred. Oxidation with periodate results primarily in an oxidizing ring cleavage between the C2- and C3-positions of the glucose units, in each case two OH groups being oxidized to two aldehyde groups. By contrast, the oxidation via phosphoric acid/sodium nitrite or via TEMPO-catalysed sodium hypochlorite leads primarily to the oxidation of the primary OH group at the C6-position to a carboxyl group.

The slightly oxidized celluloses used in the process according to the present invention typically have average degrees of polymerization ($DP_{cuen}$) in the range from 100 to 3000, preferably in the range from 200 to 2500 and more preferably in the range from 250 to 2000 and even more preferably in the range from 300 to 1500, determined according to the method described in SCAN-C15:62 ("Viscosity of Cellulose in Cupriethylenediamine (CED)" in *Scandinavian Pulp, Paper and Boards Testing Commitee*, October 1962). The use of particularly short-chain slightly oxidized celluloses, for example due to preceding acid hydrolysis, is not necessary.

The carboxyl or carbonyl content of the slightly oxidized cellulose used in the process according to the present invention in step a) is typically in the range from 200 to 1500 mmol/kg, preferably in the range from 300 to 1200 mmol/kg and more preferably in the range from 400 to 900 mmol/kg, with regard to the slightly oxidized cellulose.

Water is preferably used as medium for dispersing the particles. The pH of the aqueous medium which is not strongly acidic is preferably in the range above 5, more preferably above 6, even more preferably in the range from 6 to 10 and yet even more preferably in the range from 6.5 to 8.

In the process according to the present invention the energy input in step b) is preferably at least 2000 kWh/t, more preferably at least 5000 kWh/t and even more preferably at least 10 000 kWh/t, with regard to the mass of the slightly oxidized cellulose.

Energy can be input into step b) using in principle any apparatus and technique known to a person skilled in the art. Preferably the input of energy in step b) is effected via ultrasonicators, high-speed stirrers, dispersing devices based on the rotor-stator principle (for example Ultra-Turrax® units), jet dispersers and dispersing devices of the Microfluidizer® type.

Dispersing devices based on the rotor-stator principle, e.g. Ultra-Turrax® units (available from IKA), are dispersing devices for emulsifying, homogenizing and suspending flowable media. The effective frequency is adjustable and can be conformed to the substance or mixture of substances to be processed.

The principle of a Microfluidizer® (available from Microfluidics) can be described as follows. The material to be processed is led under high pressure through an interaction chamber. The sample flows through one or two narrow pathways and reaches linear speeds of up to 1000 m/s or even more, depending on the type of instrument. This creates enormous shearing forces. There are no moving parts in the chamber, ensuring a narrow particle and droplet distribution.

"Dispersing device of the Microfluidizer® type" refers to any dispersing device comprising the following features and functions:
  one or more channels for conducting a material, for example a cellulose or cellulose derivative in an aqueous medium, to an interaction chamber,
  the interaction chamber comprising one or more facilities, e.g. one or more rifts or noozles,
  the material is conducted under high pressure, preferably at least 20,000 MPa, more preferably 30,000 bis 300,000 MPa, to the interaction chamber,
  the facilities in combination with the high pressure cause in the interaction chamber an increasement of the velocity of the introduced material, preferably to at least 200 m/s, more preferably to at least 500 m/s, and even more preferably to at least 1000 m/s, and
  construction means allowing a pressure drop with effect to the material stream having passed the interaction chamber.

The energy input in stage b) can in principle be effected in one or more stages, but also continuously using a variable energy input.

In a preferred embodiment of the process of the invention the input of energy in step b) is effected in at least two stages comprising the input of energy in a first stage via a dispersing device based on the rotor-stator principle followed by the input of energy in a second stage via a dispersing device of the Microfluidizer® type. It is believed that in the first stage mainly the fiber structure of the cellulosic particles is disintegrated while in the microfluidizer stage mainly comminution in the nanoscale range takes place due to reduction of the chain length of the cellulose molecules.

The dispersion obtained in step b) has a solids concentration with regard to the slightly oxidized cellulose of preferably 0.1% to 10% by weight, more preferably 0.5% to 3.5% by weight and most preferably 0.75% to 2.5% by weight.

The dispersing effected in step b), in particular due to the input of energy, can have the effect of reducing the degree of polymerization of the slightly oxidized cellulose. A reduction of 5 to 50% in the degree of polymerization is possible. Therefore, the slightly oxidized cellulose obtained in step b) can have an average degree of polymerization in the range from 50 to 2900 and preferably in the range from 100 to 2400.

The addition of dispersants or emulsifiers to stabilize the cellulose dispersion is not necessary in the process of the present invention. In a preferred embodiment of the invention, therefore, no dispersant or emulsifier, preferably no fatty acid salt or alkylbenzenesulphonate, is added before, during or after the dispersing step b). Nevertheless, further stabilization can be achieved through addition of such agents.

The process of the present invention, in particular step b), is preferably carried out at temperatures of 10 to 100° C. and more preferably 20 to 80° C.

It follows from the above described process that the present invention also provides a dispersion containing particles of slightly oxidized cellulose, wherein the D50 value and preferably the D90 value of the particles is less than 300 nm, preferably less than 200 nm and more preferably less than 100 nm, determined by dynamic laser light scattering, and wherein the solids concentration of the slightly oxidized cellulose in the dispersion is in the range from 0.1% to 10% by weight, preferably in the range from 0.5% to 3.5% by weight and most preferably in the range from 0.75% to 2.5% by weight.

Preferably, the slightly oxidized cellulose of the dispersion according to the present invention is from chemical pulp, paper-grade pulp, microcrystalline cellulose or linters cellulose.

As mentioned above the dispersing effected in step b) of the process of the invention, in particular due to the input of energy, can have the effect of reducing the degree of polymerization of the slightly oxidized cellulose. A reduction of 5 to 50% in the degree of polymerization is possible. Therefore, the slightly oxidized cellulose of the dispersion according to the present invention obtained in said step b) can have an average degree of polymerization $DP_{cuen}$ in the range from 50 to 2900 and preferably in the range from 100 to 2400, determined as described in SCAN-C15:62.

EXAMPLES

The oxidized celluloses used in the examples were produced by reaction with sodium hypochlorite and TEMPO (Montanari et al., Macromolecules 38 (2005) 1665). The cellulose derivatives were dispersed in water using a high-speed stirrer working according to the rotor-stator principle (Ultra Turrax® T25 basic, IKA, speed of rotation 20 000 min$^{-1}$). A Microfluidizer® of the type 110F (Microfluidics, Newton Mass. USA) having two interaction chambers connected in series (H210Z 200 μm and JR20Z 50 μm) was used for further homogenization.

The carboxyl content was determined in accordance with the TAPPI standard T 237 cm-98 (Carboxyl content of pulp).

Dynamic laser light scattering measurement was carried out using a Horiba LB 550 (USA) having a measuring range from 1 nm to 6 μm. To this end, the diffusion rates of the suspended particles are measured via the Doppler shift in the frequency of the laser light scattered by them. The frequency shifts are captured by a detector as intensity fluctuations in the scattered light. Not only the D50 values (50% of the particles are smaller than the stated dimension) but also the D90 values (90% of the particles are smaller than the stated dimension) are determined.

The average degree of polymerization $DP_{cuen}$ was determined according to the method described in SCAN-C15:62 ("Viscosity of Cellulose in Cupriethylenediamine (CED)" in *Scandinavian Pulp, Paper and Boards Testing Commitee*, October 1962).

Example 1

A 1% by weight (w/w) suspension of oxidized cellulose having a carboxyl content of 600 mmol/kg and a $DP_{cuen\ (copper(II)\ ethylenediamine\ solution)}=858$ in water was initially beaten for 1 hour with an Ultra-Turrax® and then homogenized with a Microfluidizer® for 1 hour at 600 bar and a further 2 hours at 1100 bar.

FIG. 1 shows the dynamic laser light scattering measurement of the nano carboxycellulose dispersion (1% by weight) produced according to Example 1.

The dynamic laser light scattering measurement of this sample gives a D50 value of 76 nm and also a D90 value of 107 nm.

Example 2

A 1% by weight (w/w) suspension of oxidized cellulose having a carboxyl content of 453 mmol/kg and a $DP_{cuen}=1479$ in water was initially beaten for 1 hour with an Ultra-Turrax® and then homogenized with a Microfluidizer® for 1 hour at 600 bar and a further 2 hours at 1100 bar.

Figure 2:
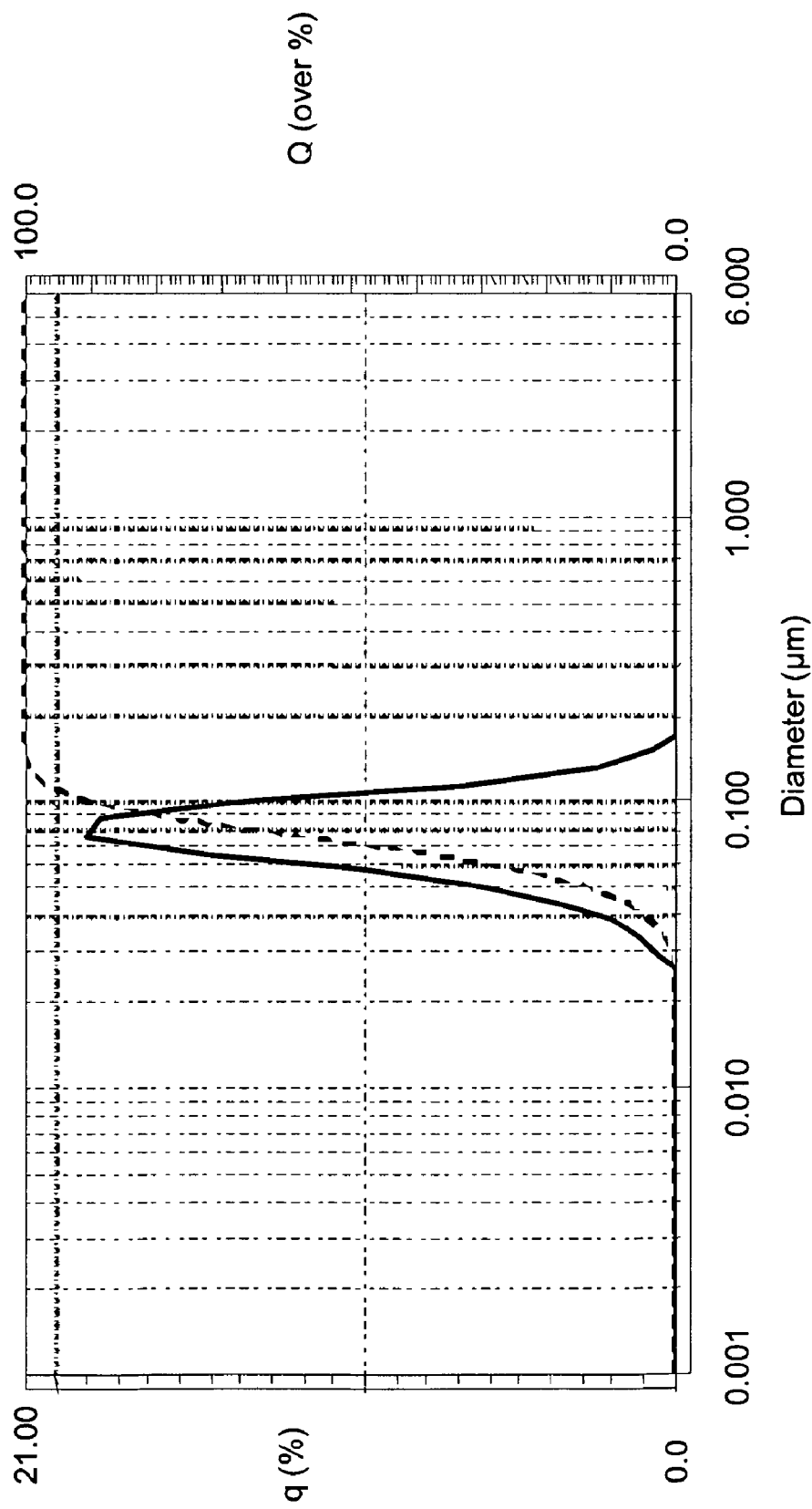

FIG. 2 shows the dynamic laser light scattering measurement of the nano carboxycellulose dispersion (1% by weight) produced according to Example 2.

The dynamic laser light scattering measurement of this sample gives a D50 value of 72 nm and also a D90 value of 100 nm.

Example 3

A 1% by weight (w/w) suspension of oxidized cellulose having a carboxyl content of 550 mmol/kg and a $DP_{cuen}=1322$ in water was initially beaten for 1 hour with an Ultra-Turrax® and then homogenized with a Microfluidizer® for 1 hour at 600 bar and a further 2 hours at 1100 bar.

Figure 3:
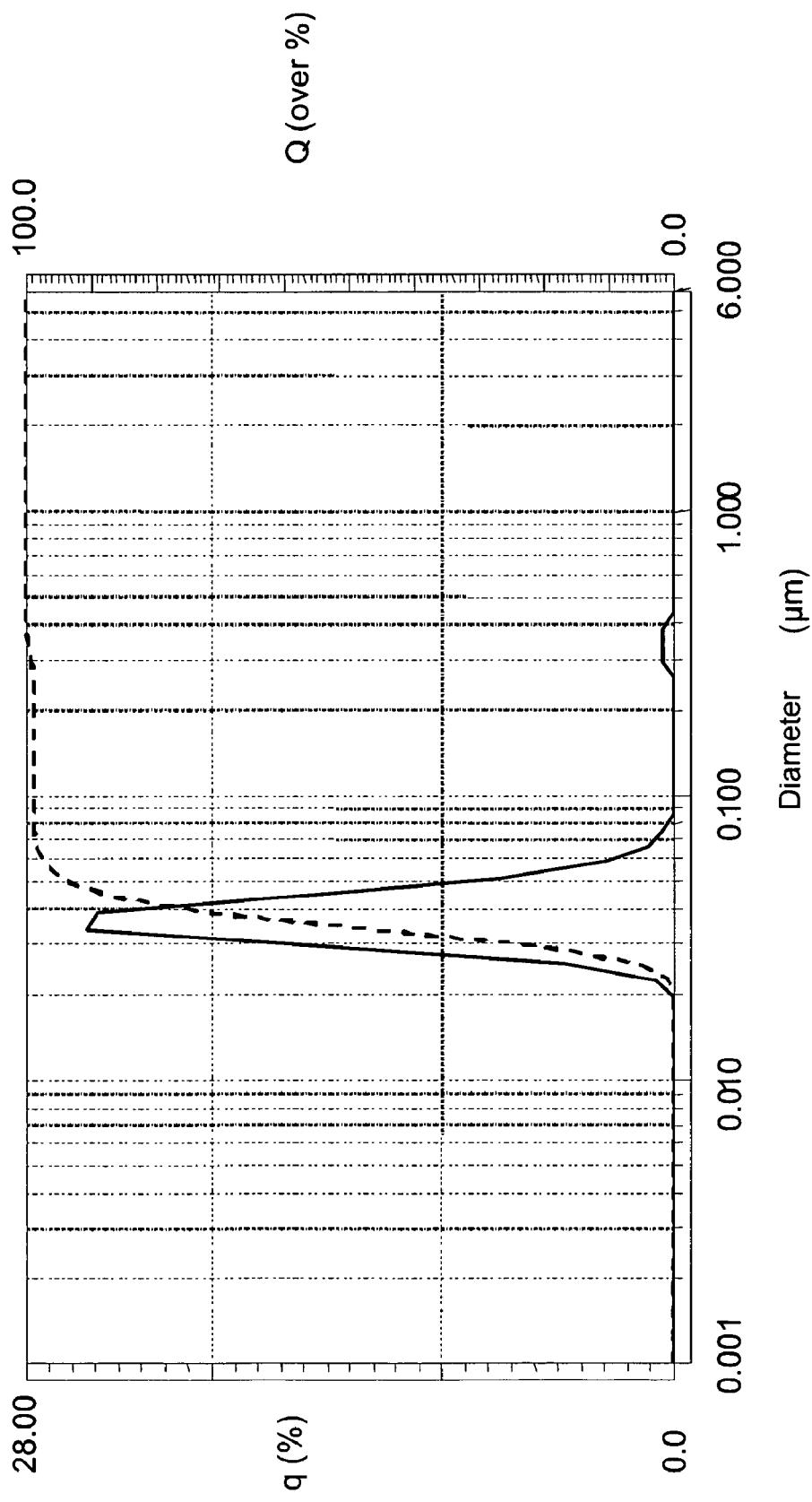

FIG. 3 shows the dynamic laser light scattering measurement of the nano carboxycellulose dispersion (1% by weight) produced according to Example 3.

The dynamic laser light scattering measurement of this sample gives a D50 value of 34 nm and also a D90 value of 47 nm.

The invention claimed is:

1. Process for producing a dispersion containing particles of slightly oxidized cellulose, which process comprises
    a) slightly oxidized cellulose being introduced into an aqueous medium and
    b) being simultaneously or subsequently dispersed therein by input of energy, wherein the volume-average particle size (D50 value) of the particles is less than 300 nm, determined by dynamic laser light scattering, wherein the D90 value of the dispersed particles is less than 300 nm, and wherein the slightly oxidized cellulose used is obtained by periodate oxidation, phosphoric acid/sodium nitrite oxidation or TEMPO-catalysed sodium hypochlorite oxidation,
    wherein no dispersant is added before, during or after dispersing step b).

2. Process according to claim 1, wherein the slightly oxidized cellulose used is obtained from chemical pulp, paper-grade pulp, microcrystalline cellulose or linters cellulose.

3. Process for producing a dispersion containing particles of slightly oxidized cellulose, which process comprises
    a) slightly oxidized cellulose being introduced into an aqueous medium and
    b) being simultaneously or subsequently dispersed therein by input of energy, wherein the volume-average particle size (D50 value) of the particles is less than 300 nm, determined by dynamic laser light scattering, and wherein the slightly oxidized cellulose used is obtained by periodate oxidation, phosphoric acid/sodium nitrite oxidation or TEMPO-catalysed sodium hypochlorite oxidation,
    wherein no dispersant is added before, during or after dispersing step b), wherein the slightly oxidized cellulose used has an average degree of polymerization $DP_{cuen}$ in the range from 100 to 3000.

4. Process according to claim 1, wherein the slightly oxidized cellulose used has a carboxyl or carbonyl content of 200 to 1500 mmol/kg with regard to the slightly oxidized cellulose.

5. Process according to claim 1, wherein the energy input in step b) is at least 2000 kWh/t with regard to the mass of the slightly oxidized cellulose.

6. Process according to claim 1, wherein the input of energy in step b) is effected via ultrasonicators, high-speed stirrers, dispersing devices based on the rotor-stator principle, jet dispersers or high pressure homogenizing dispersing devices.

7. Process according to claim 1, wherein the input of energy in step b) is effected in at least two stages comprising the input of energy in a first stage via a dispersing device based on the rotor-stator principle followed by the input of energy in a second stage via a high pressure homogenizing dispersing device.

8. Process for producing a dispersion containing particles of slightly oxidized cellulose, which process comprises
  a) slightly oxidized cellulose being introduced into an aqueous medium and
  b) being simultaneously or subsequently dispersed therein by input of energy, wherein the volume-average particle size (D50 value) of the particles is less than 300 nm, determined by dynamic laser light scattering, and wherein the slightly oxidized cellulose used is obtained by periodate oxidation, phosphoric acid/sodium nitrite oxidation or TEMPO-catalysed sodium hypochlorite oxidation, wherein no dispersant is added before, during or after dispersing step b), wherein the dispersion obtained in step b) has a solids concentration with regard to slightly oxidized cellulose in the range from 0.1% to 10% by weight.

9. Process according to claim 1, wherein step b) is carried out at temperatures of 10 to 100° C.

* * * * *